BEST AVAILABLE COPY
J. O'BRIEN.
Plant Duster.
No. 201,441.   Patented March 19, 1878.
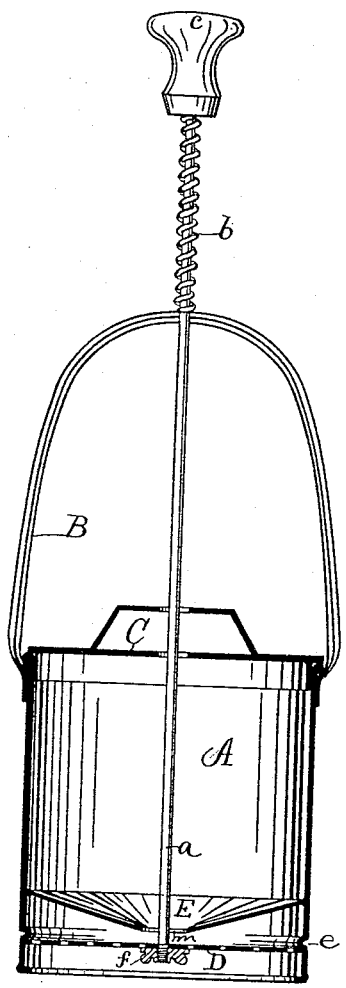
Witnesses.
H. N. Gale.
F. H. North
Inventor.
John. O'Brien
By James Shepard Atty.

UNITED STATES PATENT OFFICE.

JOHN O'BRIEN, OF NEW BRITAIN, CONNECTICUT.

IMPROVEMENT IN PLANT-DUSTERS.

Specification forming part of Letters Patent No. 201,441, dated March 19, 1878; application filed June 8, 1877.

*To all whom it may concern:*

Be it known that I, JOHN O'BRIEN, of New Britain, in the county of Hartford and State of Connecticut, have invented certain new and useful Improvements in Machines for Dusting Plants, of which the following is a specification:

My invention consists in the combination of a dust-receptacle open at its lower end, a movable sieve filling said open end, and a vertical-moving agitating-rod; also, in combination of the foregoing with a spring; and also in the combination of a false bottom with other parts, as hereinafter described.

The accompany drawing shows a vertical section of a machine for dusting plants which embodies my invention.

A designates the dust-receptacle, which may be of any desired form and size. The one represented in the drawing is of cylindrical form. A suitable bail or handle, B, is rigidly attached to the receptacle, and the top is covered by any suitable cover, C. At the lower end of the receptacle A is a movable sieve, D, the edges of which fit the interior of the cylindrical receptacle, so as to fill the same, but loosely enough, so that it may be freely moved up and down therein, whereby the lower end of the receptacle answers for a bearing for the sieve, to hold it in position laterally. This sieve constitutes the bottom of the receptacle, and has attached to it an agitating-rod, a, which extends upward through the bail in which it takes its upper bearing, and at its upper end is provided with a spring, b, and handle c, one end of said spring resting against the bail and the opposite end against the under side of the handle c, the coils being open, and the spring continually pressing the handle to draw it and the movable sieve upward. A bead, e, or other suitable stop upon the inside of the receptacle A, stops the upward movement of the sieve at the point shown in the drawing.

The metal at the lower end of the receptacle may be turned inward, or other stops provided to stop or limit the downward movement of the sieve.

The sieve may be attached to the rod in any proper manner, as by solder; but I prefer to fasten it first to a central hub, f, provided with a central and threaded hole, and screw it upon the lower end of the agitator-rod. The hub f, if placed on the under side of the sieve, may be provided with lateral lugs, to act as thumb-pads for use in screwing on the sieve. When so constructed, the stops at the lower end to limit the downward movement of the sieve may be made detachable, or the stops may be located elsewhere, as on the rod a, and engage with the cover, in which case the sieve can readily be removed.

In order to relieve the spring of a portion of its load, and also to prevent the entire mass of material within the receptacle from being agitated at every movement of the sieve, I place a false bottom, E, having one or more openings, m, through which a portion only of the material will pass whenever the sieve is depressed, so that the mass of said material works down gradually. The material so working down will not, when the sieve is depressed, fill all the space under the false bottom, especially if made conical, as shown, so that upon the return of the sieve upward the material will be drawn up into the space under the false bottom without lifting the mass of material above said bottom. Thus it will be seen that the lifting-power of the spring need not be so great when the false bottom is used as it would have to be in case the said bottom were dispensed with.

If desired, the machine might be made without the said false bottom, and I contemplate such manufacture, and when so made it will be a practical and operative machine. I have herein shown a conical form of false bottom; but the same may be of other forms, provided with suitable openings, either in a horizontal, vertical, or inclined plane, without changing the office of said bottom, or the combination of it with other parts.

The spring may be of any ordinary kind and located at any desired point, so as to continually press the rod and sieve in one direction.

When it is desired to dust ashes, plaster-paris, guano, paris-green, or any other pulverized fertilizer, poison, or material upon plants, the same is placed in the receptacle, the machine held over the plant to be dusted, and a quick blow directed upon the handle, which moves the sieve suddenly downward, compressing the spring, which then acts to raise the sieve, when it is abruptly stopped by contact with the bead or stop $c$. These sudden agitations cause the material to pass through the sieve and dust the plant over which it is held. By jarring the sieve more or less through the medium of the handle, any desired quantity of material may be dusted upon the plants.

Different materials may require different grades of sieves, and if the sieve is screwed on in the preferable manner, as shown, and arranged removable, as suggested, one sieve may be removed and another of a coarser or finer grade readily substituted therefor.

By making the sieve movable and agitating it, instead of moving an agitator over it, the sieve is less liable to become clogged, and in case it should become so, the agitator will have a tendency to free it. The manner of operating the machine is believed to be an easy and convenient one.

I claim as my invention—

1. In a machine for dusting plants, the combination of a dust-receptacle open at its lower end, a movable sieve filling said lower end, and a vertically-moving agitating-rod, substantially as described, and for the purpose specified.

2. In combination with a dust-receptacle open at its lower end, a movable sieve filling said lower end, and a vertically-moving agitating-rod, a spring to move the rod and sieve in one direction, substantially as described, and for the purpose specified.

3. The combination of a false bottom with a dust-receptacle open at its lower end, movable sieve, and a vertically-moving agitating-rod, substantially as described, and for the purpose specified.

JOHN O'BRIEN.

Witnesses:
H. N. GALE,
JAMES SHEPARD.